(12) United States Patent
Barzik et al.

(10) Patent No.: US 10,031,823 B2
(45) Date of Patent: Jul. 24, 2018

(54) DANGEROUS SYSTEM COMMAND DETECTION

(71) Applicant: INTERNATIONAL BUSINESS MACHINES CORPORATION, Armonk, NY (US)

(72) Inventors: Zah Barzik, Rishon LeZion (IL); Lior Chen, Jerusalem (IL); Maxim Kalaev, Petach Tikva (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 107 days.

(21) Appl. No.: 15/075,446

(22) Filed: Mar. 21, 2016

(65) Prior Publication Data

US 2017/0270019 A1 Sep. 21, 2017

(51) Int. Cl.
*G06F 11/00* (2006.01)
*G06F 11/263* (2006.01)
*H04L 12/26* (2006.01)
*G06F 9/455* (2018.01)

(52) U.S. Cl.
CPC ........... *G06F 11/263* (2013.01); *H04L 43/50* (2013.01); *G06F 2009/45579* (2013.01); *G06F 2009/45591* (2013.01)

(58) Field of Classification Search
CPC .................................................. G06F 11/2215
See application file for complete search history.

(56) References Cited

U.S. PATENT DOCUMENTS

| 7,647,589 | B1 | 1/2010 | Dobrovolskiy et al. |
| 8,166,458 | B2 * | 4/2012 | Li .......................... G06F 9/5038 709/223 |
| 2005/0246453 | A1 * | 11/2005 | Erlingsson ............ G06F 9/4555 710/1 |
| 2014/0006877 | A1 | 1/2014 | Zhu et al. |

(Continued)

OTHER PUBLICATIONS

Fraser et al., "Safe Hardware Access with the Xen Virtual Machine Monitor," 1st Workshop on Operating System and Architectural Support for the on demand IT Infrastructure (Oasis), 2004 (10 pages).

(Continued)

*Primary Examiner* — Christopher S McCarthy
(74) *Attorney, Agent, or Firm* — Griffiths & Seaton PLLC

(57) ABSTRACT

Methods, computing systems and computer program products implement embodiments of the present invention that include defining, for a computer system, one or more system tests, and performing each of the system tests on the computer system. Each of the system tests includes one or more system commands, and in some embodiments, a given system test may be performed by executing one or more system commands while the computer system simultaneously processes additional system commands that perform input/output operations. Upon detecting a failure of a given system command in a given system test to execute correctly, the computer system can be configured to suppress execution of the given system command. In some embodiments, the computer system includes a hypervisor controlling a virtual machine configured as a node of a software defined storage system, and the failure can be a disruption of the hypervisor or the virtual machine.

20 Claims, 3 Drawing Sheets

(56) References Cited

U.S. PATENT DOCUMENTS

2015/0186200 A1    7/2015  Chen
2016/0216984 A1*   7/2016  Tsirkin ................ G06F 9/45558

OTHER PUBLICATIONS

Ishimatsu et al., "Modeling and Hazard Analysis Using STPA," Proceedings of the 4th IAASS Conference, Making Safety Matter SP-680, 2010 (11 pages).
Le et al., "ReHype: Enabling VM Survival Across Hypervisor Failures," Proceedings of the 7th ACM SIGPLAN/SIGOPS International Conference on Virtual Execution Environments, VEE '11, ACM SIGPLAN Notices—VEE '11, v.46, i.7, Jul. 2011 (12 pages).
Le, Michael Vu, "Resilient Virtualized Systems," Dissertation, University of California, Los Angeles, 2014 (254 pages).
Tan et al., "TinyChecker: Transparent Protection of VMs against Hypervisor Failures with Nested Virtualization," IEEE/IFIP 42nd International Conference on Dependable Systems and Networks Workshops (DSN-W), IEEE, 2012 (7 pages).
Xu et al., "Xentry: Hypervisor-Level Soft Error Detection," 43rd International Conference on Parallel Processing (ICPP), IEEE, Sep. 9-12, 2014 (10 pages).

\* cited by examiner

DANGEROUS SYSTEM COMMAND DETECTION

FIELD OF THE INVENTION

The present invention relates generally to system testing, and specifically to detecting device commands that do not behave correctly in a computer system.

BACKGROUND

In software-defined computing (SDC), a computing infrastructure is virtualized and delivered as a service. For example, in a software-defined storage (SDS) system storage hardware is separated from software that manages the storage infrastructure. In SDS, the software managing a software-defined storage environment may also provide policy management for features such as deduplication, replication, thin provisioning, snapshots and backup. By definition, SDS software is separate from the hardware it is managing, and can be implemented via appliances over a traditional Storage Area Network (SAN), or implemented as part of a scaled-out Network-Attached Storage (NAS) solution, or as the basis of an Object-based storage solution.

The description above is presented as a general overview of related art in this field and should not be construed as an admission that any of the information it contains constitutes prior art against the present patent application.

SUMMARY

There is provided, in accordance with an embodiment of the present invention a method, including defining, for a computer system, one or more system tests, each of the system tests including one or more system commands, performing each of the system tests on the computer system, detecting, in the computer system, a failure of a given system command in a given system test to execute correctly, and configuring the computer system to suppress execution of the given system command.

There is also provided, in accordance with an embodiment of the present invention a computer system, including multiple modules, a given module configured to define one or more system tests, each of the system tests including one or more system commands, to perform each of the system tests on the computer system, to detect, in the given module, a failure of a given system command in a given system test to execute correctly, and to configure the multiple modules to suppress execution of the given system command.

There is further provided, in accordance with an embodiment of the present invention a computer program product, the computer program product including a non-transitory computer readable storage medium having computer readable program code embodied therewith, the computer readable program code including computer readable program code configured to define, for a computer system, one or more system tests, each of the system tests including one or more system commands, computer readable program code configured to perform each of the system tests on the computer system, computer readable program code configured to detect, in the computer system, a failure of a given system command in a given system test to execute correctly, and computer readable program code configured to configure the computer system to suppress execution of the given system command.

BRIEF DESCRIPTION OF THE DRAWINGS

The disclosure is herein described, by way of example only, with reference to the accompanying drawings, wherein.

DETAILED DESCRIPTION OF EMBODIMENTS

Software defined storage system (SDS) nodes are typically implemented in virtual machines (VMs), and are designed to execute on computer systems having different hardware and software configurations. In operation, different hardware devices such as disk controllers and different software modules such as hypervisors can behave very differently when processing system commands that are received from SDS virtual machines managed by a hypervisor.

For example, an input/output (I/O) abort issued to a disk controller by a given SDS virtual machine may result in a storage adapter reset, which can force the hypervisor to suspend the given SDS virtual machine, or to stall I/O operations to other storage devices attached to the same controller until the reset is completed. If the given SDS VM misses any SDS "KEEP ALIVE" messages while the storage adapter is performing the reset, the SDS system may flag the given SDS VM as a failed node, effectively amplifying a single disk transient error to a failure of an entire SDS system node. Another example may comprises a solid state disk (SSD) drive (i.e., a storage device) failing after receiving, from a given SDS VM, a (usually legitimate) "GET SENSE" command for specified pages as part of system log collection in response to a (probably unrelated) failure.

Embodiments of the present invention provide methods and systems for early detection of dangerous device input/output (I/O) commands in a computer system such as an SDS system. In embodiments described herein, a dangerous command comprises a system command that fails to execute correctly, and whose misbehavior negatively impacts operation of the computer system.

As described hereinbelow, one or more system tests are defined for a computer system (e.g., a physical storage system or an SDS system), each of the system tests comprising one or more system commands, and each of the system tests are performed on the computer system. Upon detecting, in the computer system, a failure of a given system command in a given system test to execute correctly, the storage system can be configured to suppress execution of (i.e., ignore any requests to perform) the given system command.

Figure 1:
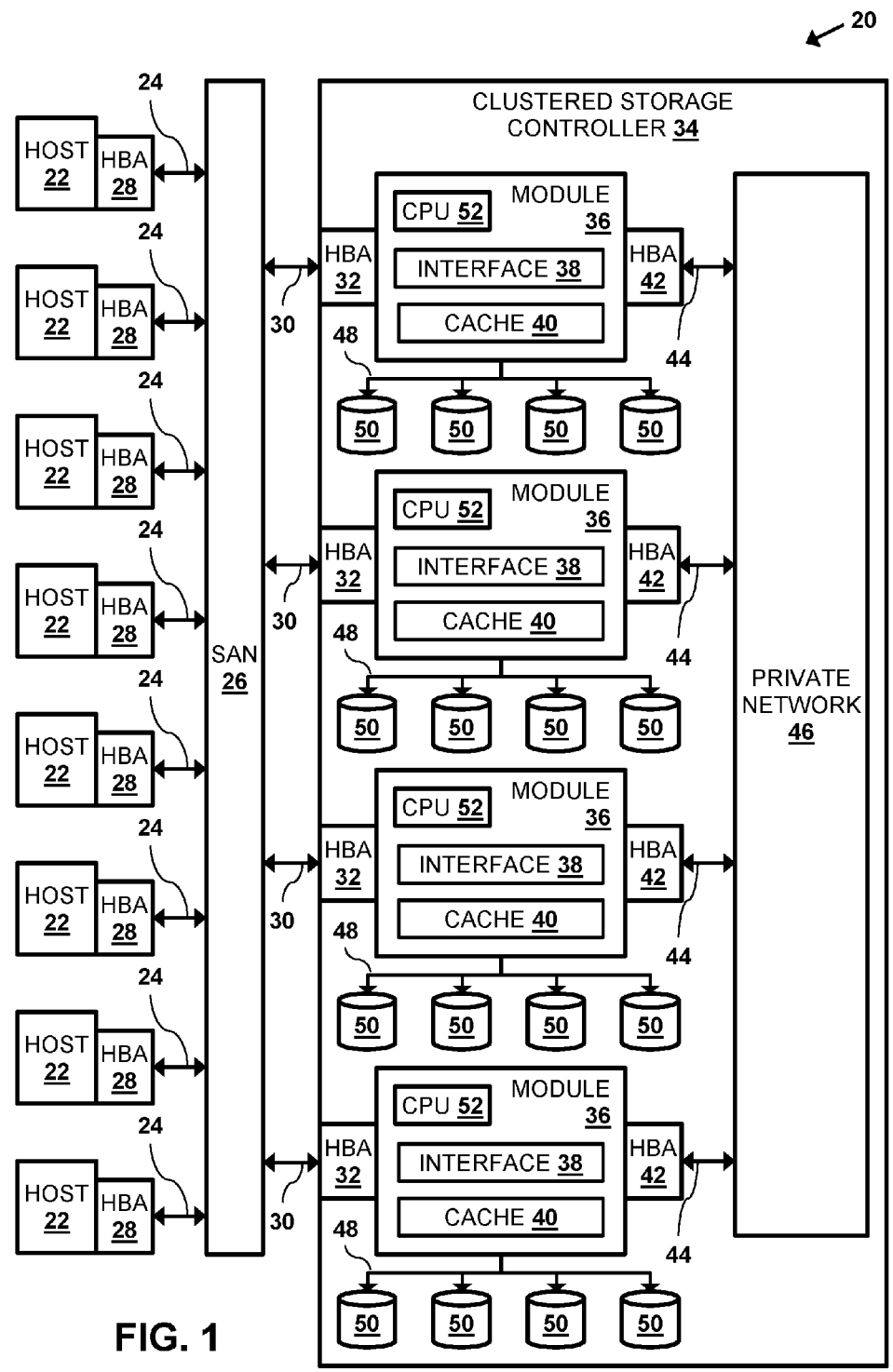
FIG. 1 is a block diagram that schematically illustrates host computers coupled to a storage system comprising a storage controller having multiple modules, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 40 (in communication between adapters and 42), and a cache 38. Each storage module 36 is responsible for a number of storage devices 50 by way of a data connection 48 as shown.

As described previously, each storage module 36 further comprises a given cache 38. However, it will be appreciated that the number of caches 38 used in storage subsystem 20 and in conjunction with clustered storage controller 34 may be any convenient number. While all caches 38 in storage subsystem 20 may operate in substantially the same manner and comprise substantially similar elements, this is not a requirement. Each of the caches 38 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 38 coupled to respective sets of storage devices 50. In some configurations, the sets of storage devices 50 comprise one or more hard disks, or solid state drives (SSDs) which can have different performance characteristics. In response to an I/O command, a given cache 38, by way of example, may read or write data at addressable physical locations of a given storage device 50. In the embodiment shown in FIG. 1, caches 38 are able to exercise certain control functions over storage devices 50. These control functions may alternatively be realized by hardware devices such as disk controllers (not shown), which are linked to caches 38.

Each storage module 36 is operative to monitor its state, including the states of associated caches 38, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 38 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller comprising any multiple of modules 36 coupled to any plurality of storage devices 50 is considered to be with the spirit and scope of the present invention.

Figure 2:
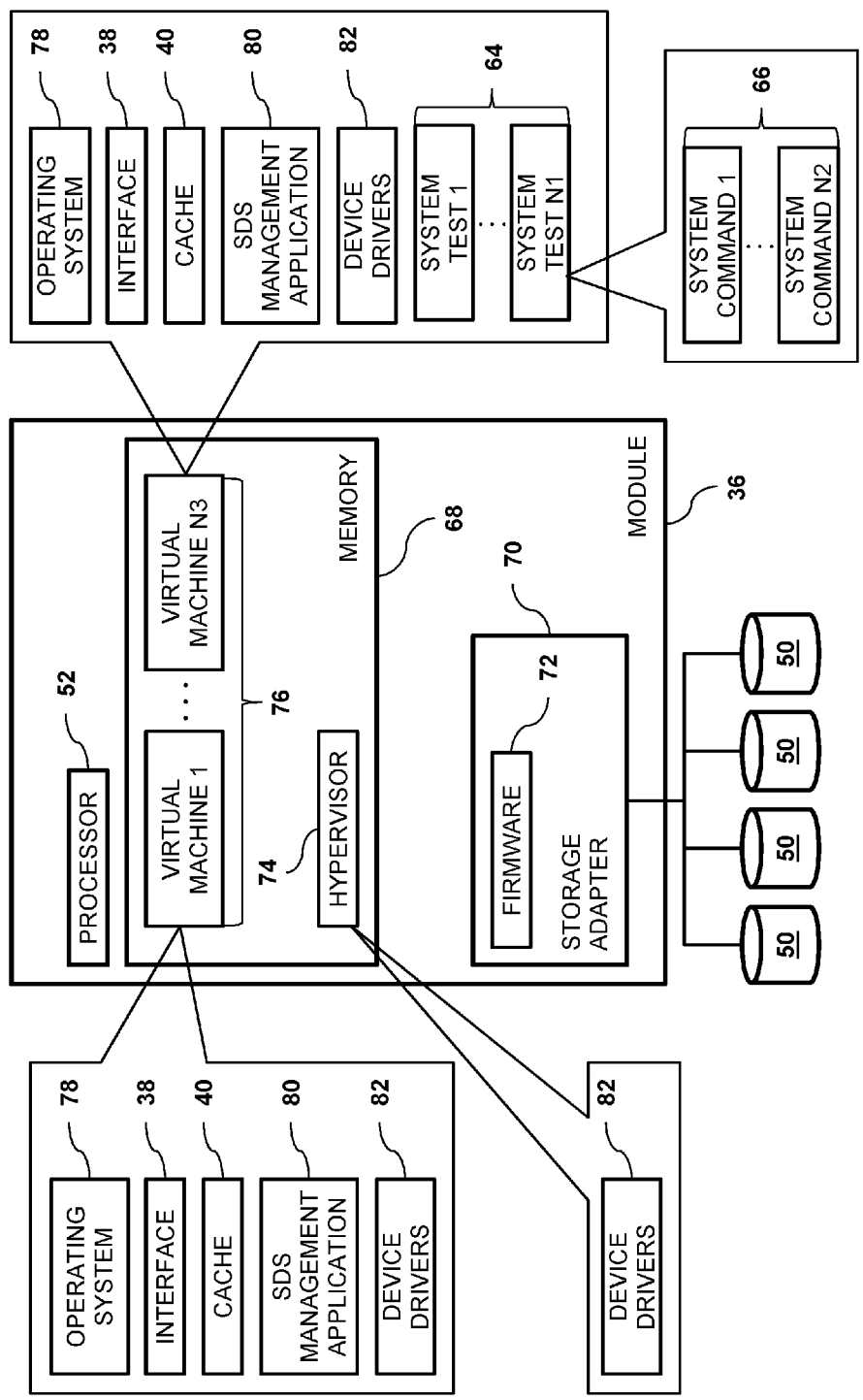
FIG. 2 is a block diagram that schematically illustrates a given module in the storage controller configured as a node of a software defined storage (SDS) system, in accordance with an embodiment of the present invention.

FIG. 2 is a block diagram that schematically illustrates a given module 36 configured to detect device and system errors in clustered storage controller 34, in accordance with an embodiment of the present invention. In the configuration shown in FIG. 2, the given module is configured as a node of an SDS system that can be implemented on one or more storage controllers 34.

In addition to processor 52 (also referred to herein as a module processor), each module 36 comprises a module memory 68, and a storage adapter 70 that manages storage devices 50. Storage device 70 comprises firmware 72 comprising software instructions that manage operation of the storage device.

In each module 36 configured as a node of the SDS system, processor 52 executes, from memory 68, a hypervisor 74 that manages one or more virtual machines 76 that are also in stored the module memory. While (for purposes of simplicity) the configuration in FIG. 2 shows processor 52 executing a single hypervisor 74 that controls multiple virtual machines 76, each processor 52 executing multiple hypervisors controlling respective sets of virtual machines 76 is considered to be within the spirit and scope of the present invention.

Each of the virtual machines is configured as an SDS node, and comprises instances of interface 38 and cache 40, an operating system 78, and an SDS management application 80 that comprises a distributed software application that configures multiple virtual machines 76 in modules 36 to operate as an SDS system. Memory 68 also stores device drivers 82 that enable processor 52 to communicate with (and manage) hardware modules such as storage adapter 70. In the configuration shown in FIG. 2 device drivers can be stored in (and executed from) virtual machines 76 and/or hypervisor 74.

In embodiments described herein, a given virtual machine 76 is configured as an SDS testing node and comprises (i.e., in addition to instances of operating system 78, interface 38, cache 40, SDS management application 80 and device drivers 82) one or more system tests 64, each of the system tests comprising one or more system commands 66. In embodiments of the present invention, system commands 66 are typically non-critical commands that an SDS system does not need to execute to process I/O operations. Examples of non-critical commands include, but are not limited to, commands to examine device logs and commands to handle device I/O errors.

Processors 52 comprise general-purpose central processing units (CPU) or special-purpose embedded processors, which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of processors 52 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Misbehavior Detection

Figure 3:
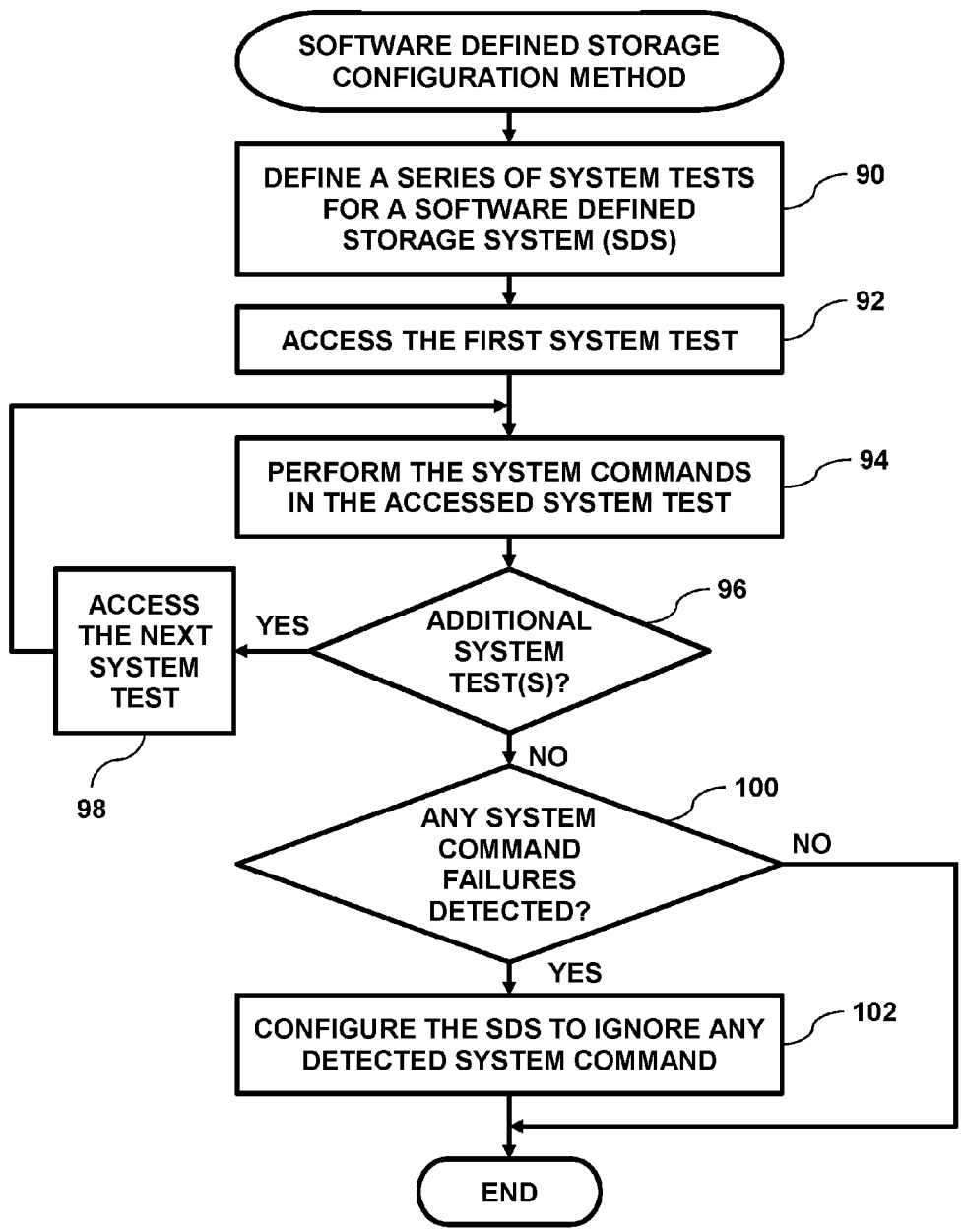
FIG. 3 is a flow diagram that schematically illustrates a method of configuring the SDS system to avoid dangerous system commands, in accordance with an embodiment of the preset invention.

FIG. 3 is a flow diagram that schematically illustrates a method of detecting misbehaving device commands in a computer system, and using the detected commands to configure the computer system, in accordance with an embodiment of the present invention. The system commands are typically configured to test hardware components (e.g., a given HBA 32 or storage adapter 70), device firmware (e.g., firmware 72) or software such as device drivers 82.

While embodiments herein describe a given virtual machine detecting misbehaving system commands on modules 36 configured as a software defined storage (SDS) system, detecting misbehaving system commands on any type of computer system is considered to be within the spirit and scope of the present invention. For example a given processor 52 may detect misbehaving system commands on storage controller 34 configured as a non-virtualized storage system.

In a definition step 90, a given virtual machine 76 configured as the SDS testing node executing on a given processor 52 defines system tests 64 for an SDS system implemented on multiple modules 36. In some embodiments, the given virtual machine can define system tests 64 by either retrieving the system tests from a given storage device 50 or by receiving the system tests from a given host computer.

In a first access step 92, the given virtual machine accesses the first system test 64, and in a performance step 94, the given virtual machine performs the system commands in the accessed system test. In some embodiments, the accessed system test may comprise one or more system commands 66 (e.g., resets and/or aborts) that the given virtual machine 76 executes while processing, in the background (i.e., performing simultaneously with the one or more conveyed system commands), additional system commands that result in the given virtual machine performing one or more I/O operations.

In a first comparison step 96, if there are additional system test 64 that have not yet been performed, then the given virtual machine accesses the next system test 64 in a second access step 98, and the method continues with step 94. If there are no more system tests 64 to be performed, then in a second comparison step 100, the given virtual machine checks if any of the system commands conveyed to the given virtual machine fail to execute correctly.

In embodiments of the present invention, failures may comprise the given virtual machine detecting that the given system command has completed successfully without causing any adverse side effects to one or more modules 36. For example, the given virtual machine may not receive a notification indicating a successful completion of the given system command due to a bug on a code path for a given device driver 82 that results in the given system command not being handled correctly by a device controlled by the given device driver.

An additional example of a failure that can be detected by the given virtual machine may comprise a disruption in a given module 36 upon executing a given system command 66. Examples of disruptions include, but are not limited to, a reset or a temporary suspension of hypervisor 74 and/or the given virtual machine.

If, in step 100, the given virtual machine detects any system commands 66 that were conveyed to the given virtual machine and fail to execute correctly, then in a configuration step 102, the given virtual machine configures the SDS system to ignore (i.e., to suppress execution of) any of the detected system commands, and the method ends. For example, if a detected system command 66 comprises a command to query an event log for storage adapter for storage adapter 70, then the given virtual machine can configure the given virtual machine (i.e., a given node of the SDS system) to generate a specific message (e.g., "event logs not available for the requested device") upon receiving a request to query the event log.

Returning to step 100, if there were no system commands 66 that fail to execute correctly, then the method ends. In some embodiments, upon completing the steps described in the flow diagram, a summary of the detected system commands and/or a summary of the SDS system reconfiguration can be presented to a user (e.g., a system administrator) by either saving the summary to a given storage device 50, or conveying the summary to a given host computer 22.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. A method, comprising:
defining, for a computer system, one or more system tests, each of the system tests comprising one or more system commands;

performing each of the system tests on the computer system;

detecting, in the computer system, a failure of a given system command in a given system test to execute correctly; and configuring the computer system to suppress execution of the given system command such that the computer system ignores any future requests to perform the given system command detected to fail to execute correctly.

2. The method according to claim 1, wherein performing a given system test having one or more of the system commands comprises executing, by the computer system, the one or more system commands while the computer system simultaneously processes additional system commands comprising input/output operations.

3. The method according to claim 1, wherein detecting the failure comprises detecting a disruption in the computer system upon executing the given system command.

4. The method according to claim 1, wherein the computer system comprises a storage system.

5. The method according to claim 1, wherein the computer system comprises a node of a software defined software defined storage system, the node comprising a virtual machine controlled by a hypervisor.

6. The method according to claim 5, wherein detecting the failure comprises detecting a disruption of the hypervisor.

7. The method according to claim 5, wherein detecting the failure comprises detecting a disruption of the virtual machine.

8. A computer system, comprising:

a processor executing instructions stored in a memory, wherein when executed, the instructions cause the processor to:

define one or more system tests, each of the system tests comprising one or more system commands, perform each of the system tests on the computer system, detect, in the computer system, a failure of a given system command in a given system test to execute correctly, and configure the computer system to suppress execution of the given system command such that the computer system ignores any future requests to perform the given system command detected to fail to execute correctly.

9. The computer system according to claim 8, wherein the processor performs a given system test having one or more of the system commands by executing the one or more system commands while simultaneously processing additional system commands comprising input/output operations.

10. The computer system according to claim 8, wherein the processor detects the failure by detecting a disruption upon executing the given system command.

11. The computer system according to claim 8, wherein the processor executing the instructions is comprised within a storage system.

12. The computer system according to claim 8, wherein the processor executing the instructions is comprised within a node of a software defined software defined storage system, the node comprising a virtual machine controlled by a hypervisor.

13. The computer system according to claim 12, wherein the processor detects the failure by detecting a disruption of the hypervisor.

14. The computer system according to claim 12, wherein the processor detects the failure by detecting a disruption of the virtual machine.

15. A computer program product, the computer program product comprising:

a non-transitory computer readable storage medium having computer readable program code embodied therewith, the computer readable program code comprising:

computer readable program code configured to define, for a computer system, one or more system tests, each of the system tests comprising one or more system commands;

computer readable program code configured to perform each of the system tests on the computer system;

computer readable program code configured to detect, in the computer system, a failure of a given system command in a given system test to execute correctly; and computer readable program code configured to configure the computer system to suppress execution of the given system command such that the computer system ignores any future requests to perform the given system command detected to fail to execute correctly.

16. The computer program product according to claim 15, wherein the computer readable program code is configured to perform a given system test having one or more of the system commands by executing, by the computer system, the one or more system commands while the computer system simultaneously processes additional system commands comprising input/output operations.

17. The computer program product according to claim 15, wherein the computer readable program code is configured to detect the failure by detecting a disruption in the computer system upon executing the given system command.

18. The computer program product according to claim 15, wherein the computer system comprises a storage system.

19. The computer program product according to claim 15, wherein the computer system comprises a node of a software defined software defined storage system, the node comprising a virtual machine controlled by a hypervisor.

20. The computer program product according to claim 19, wherein the computer readable program code is configured to detect the failure by detecting a disruption of a software module selected from a group consisting of the hypervisor and the virtual machine.

* * * * *